(12) United States Patent
Briggs et al.

(10) Patent No.: US 9,941,088 B2
(45) Date of Patent: Apr. 10, 2018

(54) FOLD OVER EMITTER AND COLLECTOR FIELD EMISSION TRANSISTOR

(71) Applicant: International Business Machines Corporation, Armonk, NY (US)

(72) Inventors: Benjamin D. Briggs, Waterford, NY (US); Lawrence A. Clevenger, LaGrangeville, NY (US); Michael Rizzolo, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/192,011

(22) Filed: Jun. 24, 2016

(65) Prior Publication Data

US 2016/0307723 A1    Oct. 20, 2016

Related U.S. Application Data

(62) Division of application No. 14/684,762, filed on Apr. 13, 2015, now Pat. No. 9,431,205.

(51) Int. Cl.
*H01L 21/00* (2006.01)
*H01J 21/10* (2006.01)
(Continued)

(52) U.S. Cl.
CPC .......... *H01J 21/105* (2013.01); *G06F 17/505* (2013.01); *H01J 9/025* (2013.01); *H01J 19/24* (2013.01); *G06F 2217/02* (2013.01)

(58) Field of Classification Search
CPC ........ H01J 21/105; H01J 19/24; G06F 17/505
See application file for complete search history.

(56) References Cited

U.S. PATENT DOCUMENTS 5,012,153 A * 4/1991 Atkinson ................ H01J 3/022
                                                          313/309
5,124,664 A 6/1992 Cade et al.
(Continued)

FOREIGN PATENT DOCUMENTS

EP    1383166 A2    1/2004
JP    04137434 A    5/1992
(Continued)

OTHER PUBLICATIONS

Han, Jin-Woo, et al., "Vacuum nanoelectronics: Back to the future?—Gate insulated nanoscale vacuum channel transistor," Applied Physics Letters, vol. 100 Issue 21, May 2012.
(Continued)

*Primary Examiner* — Laura Menz
(74) *Attorney, Agent, or Firm* — Matthew C. Zehrer

(57) ABSTRACT

A field emission transistor includes a gate, a fold over emitter, and fold over collector. The emitter and the collector are separated from the gate by a void and are separated from a gate contact by gate contact dielectric. The void may be a vacuum, ambient air, or a gas. Respective ends of the emitter and the collector are separated by a gap. Electrons are drawn across gap from the emitter to the collector by an electrostatic field created when a voltage is applied to the gate. The emitter and collector include a first conductive portion substantially parallel with gate and a second conductive portion substantially perpendicular with gate. The second conductive portion may be formed by bending a segment of the first conductive portion. The second conductive portion is folded inward from the first conductive portion towards the gate. Respective second conductive portions are generally aligned.

9 Claims, 11 Drawing Sheets

(51) Int. Cl.
*H01J 19/24* (2006.01)
*H01J 9/02* (2006.01)
*G06F 17/50* (2006.01)

(56) References Cited

U.S. PATENT DOCUMENTS

| | | | |
|---|---|---|---|
| 5,148,078 A * | 9/1992 | Kane | H01J 21/105 |
| | | | 313/307 |
| 5,267,884 A * | 12/1993 | Hosogi | H01J 3/022 |
| | | | 445/24 |
| 5,289,077 A * | 2/1994 | Ugajin | H01J 21/105 |
| | | | 313/308 |
| 5,463,269 A * | 10/1995 | Zimmerman | H01J 9/025 |
| | | | 313/309 |
| 5,838,027 A | 11/1998 | Kim et al. | |
| 5,888,897 A | 3/1999 | Liang | |
| 5,973,444 A | 10/1999 | Xu et al. | |
| 6,001,708 A | 12/1999 | Liu et al. | |
| 6,018,215 A | 1/2000 | Takemura | |
| 6,133,114 A | 10/2000 | Lu et al. | |
| 6,168,491 B1 | 1/2001 | Hsu et al. | |
| 6,242,794 B1 * | 6/2001 | Enquist | H01L 29/66242 |
| | | | 257/584 |
| 6,368,930 B1 * | 4/2002 | Enquist | H01L 29/66242 |
| | | | 257/E21.371 |
| 6,396,090 B1 | 5/2002 | Hsu et al. | |
| 6,680,232 B2 | 1/2004 | Grebs et al. | |
| 6,740,909 B2 * | 5/2004 | Enquist | H01L 29/66242 |
| | | | 257/197 |
| 6,756,281 B2 * | 6/2004 | Enquist | H01L 29/66242 |
| | | | 257/E21.371 |
| 7,472,984 B2 | 1/2009 | Silverbrook | |
| 8,097,915 B2 | 1/2012 | Rosner et al. | |
| 9,082,814 B2 | 7/2015 | Shiraishi et al. | |
| 9,245,671 B2 | 1/2016 | Simpson et al. | |
| 9,431,205 B1 * | 8/2016 | Briggs | H01J 21/105 |
| 9,601,604 B2 | 3/2017 | Britton et al. | |
| 2001/0010649 A1 * | 8/2001 | Lu | G11C 16/02 |
| | | | 365/185.33 |
| 2001/0019873 A1 * | 9/2001 | Enquist | H01L 29/66242 |
| | | | 438/338 |
| 2002/0142552 A1 | 10/2002 | Wu | |
| 2004/0067602 A1 | 4/2004 | Jin | |
| 2005/0236961 A1 | 10/2005 | Wei et al. | |
| 2005/0242391 A1 | 11/2005 | She et al. | |
| 2007/0210350 A1 | 9/2007 | Omura et al. | |
| 2009/0053976 A1 | 2/2009 | Roy et al. | |
| 2009/0079002 A1 | 3/2009 | Lee et al. | |
| 2011/0094315 A1 | 4/2011 | Darty et al. | |
| 2011/0233606 A1 | 9/2011 | Hsieh | |
| 2012/0119183 A1 | 5/2012 | Kharas et al. | |
| 2012/0176828 A1 | 7/2012 | Shiraishi et al. | |
| 2013/0193108 A1 | 8/2013 | Zheng et al. | |
| 2013/0241389 A1 | 9/2013 | Kisner et al. | |
| 2013/0341776 A1 | 12/2013 | Drobnik | |
| 2014/0084336 A1 | 3/2014 | Matsudai et al. | |
| 2014/0124010 A1 | 5/2014 | Vaudo et al. | |
| 2015/0048413 A1 | 2/2015 | Arakawa et al. | |
| 2015/0065020 A1 | 3/2015 | Roy et al. | |
| 2015/0144988 A1 | 5/2015 | Laven et al. | |
| 2015/0248149 A1 | 9/2015 | Yamazaki et al. | |
| 2015/0371907 A1 | 12/2015 | Lu et al. | |
| 2017/0062743 A1 * | 3/2017 | Cao | H01L 51/0558 |

FOREIGN PATENT DOCUMENTS

| | | | | |
|---|---|---|---|---|
| JP | EP 0495436 A2 * | 7/1992 | | B82Y 10/00 |
| JP | EP 0498254 A1 * | 8/1992 | | H01J 3/022 |

OTHER PUBLICATIONS

A. A. G. Driskill-Smith et al., "Nanoscale field emission structures for ultra-low voltage operation at atmospheric pressure," Appl. Phys. Lett. 71 (21), Nov. 1997.

Jin-Woo Han, et al., "The device made of nothing," Spectrum, IEEE , vol. 51, No. 7, Jul. 2014.

List of IBM Patents or Patent Applications Treated as Related, Jun. 24, 2016.

* cited by examiner

FOLD OVER EMITTER AND COLLECTOR FIELD EMISSION TRANSISTOR

FIELD

Embodiments of invention generally relate to semiconductor devices and semiconductor device fabrication methods. More particularly, embodiments relate to semiconductor structures including a field emission transistor.

BACKGROUND

Field effect transistors are semiconductor devices that are commonly found in a wide variety of integrated circuits. When a voltage is applied to a gate of the transistor that is greater than a threshold voltage, the transistor is turned on, and current may flow through the transistor. When the voltage at the gate is less than the threshold voltage, the transistor is off, and current does not flow through the transistor. The gate permits electrons to flow though or blocks their passage by creating or eliminating a channel between a source and a drain. Electrons flow from the source towards the drain through the channel.

Field emission transistors are similar semiconductor devices. However, instead of a gate or channel in between the source and drain, there is a void (e.g., vacuum, ambient, gas, etc.). Electrons are drawn across the void from the source or emitter to the drain or collector by an electrostatic field created when a voltage is applied to the gate.

SUMMARY

In an embodiment of the present invention, a field emission transistor includes a gate in electrical communication with a gate contact, gate contact dielectric material surrounding the gate contact, an emitter comprising a first emitter portion adjacent to the gate contact dielectric material and a second emitter portion angled from the first emitter portion toward the gate, and an collector comprising a first collector portion adjacent to the gate contact dielectric material and a second collector portion angled from the first collector portion toward the gate.

In yet another embodiment of the present invention, the field emission transistor may be included within a design structure embodied in a machine readable storage medium for designing, manufacturing, or testing a multi semiconductor device package.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The drawings are not necessarily to scale. The drawings are merely schematic representations, not intended to portray specific parameters of the invention. The drawings are intended to depict only exemplary embodiments of the invention. In the drawings, like numbering represents like elements.

DETAILED DESCRIPTION

Figure 1:
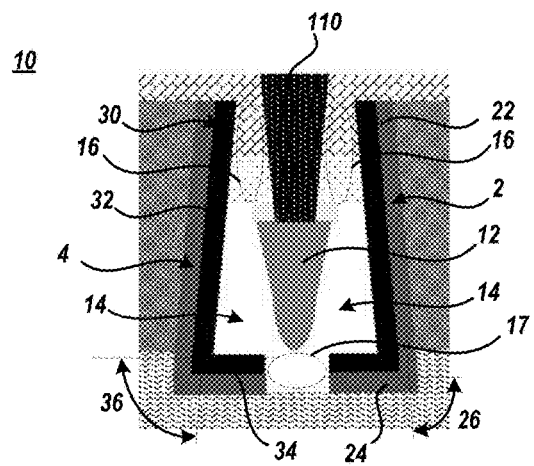
FIG. 1 depicts a cross section view of a semiconductor structure, in accordance with various embodiments of the present invention.

Detailed embodiments of the claimed structures and methods are disclosed herein; however, it can be understood that the disclosed embodiments are merely illustrative of the claimed structures and methods that may be embodied in various forms. These exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Referring to the drawings, wherein like components are labeled with like numerals, exemplary fabrication steps of forming a semiconductor structure 10 in accordance with embodiments of the present invention are shown, and will now be described in greater detail below. It should be noted that the drawings may depict cross section views of structure 10 along one or more cross sectional planes. Furthermore, it should be noted that while this description may refer to some components of the structure 10 in the singular tense, more than one component may be included within the semiconductor device. The specific number of components depicted in the drawings and the cross section orientation was chosen to best illustrate the various embodiments described herein.

As shown in FIG. 1, a semiconductor structure 10 includes a field emission gate 12, field emission emitter 2, and field emission collector 4. The emitter 2 and the collector 4 are separated from the gate 12 by void 14 and are separated from a gate contact 110 in electrical communication with the gate 12 by dielectric regions 16. Void 14 may be a vacuum, ambient air, or a gas (e.g., helium, etc.). Respective ends of emitter 2 and collector 4 are separated by a gap 17. Gap 17 is similar to void 14. Electrons are drawn across gap 17 from the emitter 2 to the collector 4 by an electrostatic field created when a voltage is applied to the gate 12. The width of gap 17 between ends of emitter 2 and collector 4 is less than the mean free path of elections in air. For example, the width of gap 17 between ends of emitter 2 and collector 4 may be 1-30 nm.

Emitter 2 and collector 4 respectively include a conductive layer 30 comprising a portion 32 substantially parallel with gate 12 and a portion 34 that is substantially perpendicular with gate 12. Substantially parallel shall mean more parallel than perpendicular. Substantially perpendicular shall mean more perpendicular than parallel. In embodiments, portion 34 may be formed by bending a segment of portion 32. Generally, an angle 36 exists between portion 32 and portion 34. The portion 34 of emitter 2 is positioned inward from portion 32 towards collector 4. Likewise, the portion 34 of collector 4 is positioned inward from portion 32 towards emitter 2. The portion 24 of emitter 2 and the portion 34 of collector 4 are generally aligned. In other words, side surfaces of emitter 2 portion 34 are generally coplanar with respective side surfaces of collector 4 portions 34.

Emitter 2 and collector 4 may further respectively include a barrier layer 22 comprising a portion of layer 20 substantially parallel with gate 12 and a portion 24 that is substantially perpendicular with gate 12. In embodiments, portion 24 may be formed by bending a segment of portion 22. Generally, an angle 26 exists between portion 22 and portion 24. The portion 24 of emitter 2 is positioned inward from portion 22 towards collector 4. Likewise, the portion 24 of collector 4 is positioned inward from portion 22 towards emitter 2. The portion 24 of emitter 2 and the portion 24 of collector 4 are generally aligned. In embodiments, conductive layer 30 may be formed upon barrier layer 20 and thus, portion 24 may be juxtaposed with portion 34 and portion 22 may be juxtaposed with portion 32. As such, the angle 26 may be similar to the angle 36.

In embodiments, barrier layer 20 and conductive layer 30 within emitter 2 and barrier layer 20 and conductive layer 30 within collector 4 may be contiguous layers, respectively, and subsequently isolated into the emitter 2 and collector 4. Further, the gate 12 may be self-aligned to gap 17 separating emitter 2 and the collector 4

Figure 2:
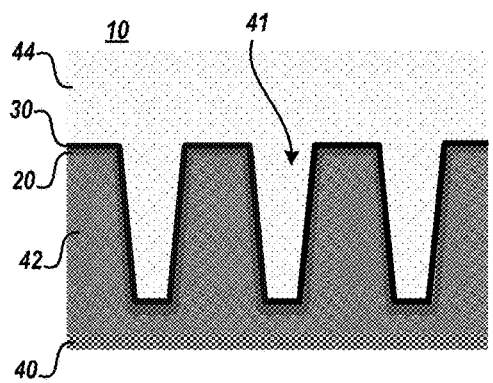
FIG. 2-FIG. 17 depicts cross section views of a semiconductor structure at intermediate stages of semiconductor device fabrication, in accordance with various embodiments of the present invention.

FIG. 2 depicts cross section views of semiconductor structure 10 at an intermediate stage of semiconductor device fabrication, in accordance with various embodiments of the present invention. At the present stage of fabrication, structure 10 includes a backside carrier 40, a dielectric layer 42, trenches 41, barrier layer 20, conductive layer 30 and a flowable layer 44.

Backside carrier 40 may be Si, glass, glass ceramics, metal or the like and is capable of forming dielectric layer 42 thereupon. Dielectric layer 42 may be TEOS, low-K dielectrics containing carbon, silicon nitrides, or combinations thereof and may be formed as a blanket layer upon backside carrier 40 to a thickness ranging from about 0.01 um to about 1 um. Dielectric layer 42 may be deposited upon carrier 40 utilizing physical vapor deposition (PVD), chemical vapor deposition (CVD), or spin-on processes.

Trenches 41 may be formed within the dielectric layer 20 utilizing subtractive etching techniques. Such processes may utilize a mask (not shown) to protect the underlying dielectric layer 42 from an etchant utilized to remove non masked regions of dielectric layer 42. The trenches 41 can be formed using process steps such as, without limitation: material deposition or formation; photolithography; imaging; etching; and cleaning. For instance, a soft mask or a hard mask can be formed to serve as the mask while non-masked material 42 is removed by the etchant. The etchant(s) may be applied to the dielectric layer 42 for a period of time to form trenches to a depth ranging from about 0.01 um to about 0.5 um. Known etch processes may be utilized to generally form trenches 41 that have sidewalls that may be perpendicular to the upper surface of dielectric layer 42, tapered out, or tapered in, e.g., as is shown.

Barrier layer 20 is optionally formed upon the upper surface of dielectric layer 42 and upon the trench 41 trough and sidewalls. Barrier layer 20 may be e.g., tantalum nitride (TaN), titanium nitride (TiN), or manganese silicate (MnSiO) and may be formed as a blanket layer upon the upper surface of dielectric layer 42 and within trenches 41 to a thickness ranging from about 1 nm to about 10 nm. Barrier layer 20 may be deposited upon carrier 40 utilizing ionized physical vapor deposition (I-PVD), PVD, CVD, or atomic layer deposition (ALD). For clarity, in those embodiments where barrier layer 20 is not utilized, reference to associated barrier layer 20 elements, such as portion 22 and portion 24, may be omitted from the applicable description.

Conductive layer 30 may be formed upon the upper surface of dielectric layer 42 and upon the trench 41 trough and sidewalls. Conductive layer 30 may be e.g., ruthenium (Ru), tungsten (W), molybdenum (Mo), Tantalum (Ta), etc. and may be formed as a blanket layer upon the upper surface of dielectric layer 42 and within trenches 41 to a thickness ranging from about 1 nm to about 10 nm. Conductive layer 30 may be deposited upon carrier 40 utilizing PVD, I-PVD, CVD, or ALD. In embodiments utilizing barrier layer 20, conductive layer 30 may be formed as a blanket layer upon the barrier layer 20 to a thickness ranging from about 1 nm to about 10 nm.

Flowable layer 44 may be oxide, FOX-14 by Dow-Corning, and may be formed as a blanket layer upon conductive layer 30 to a thickness to be coplanar with the upper surface of conductive layer 30 filling trenches 41. Flowable layer 44 may be deposited as a flowable material upon conductive layer 30 utilizing spin-on techniques or CVD with a flow step.

Figure 3:
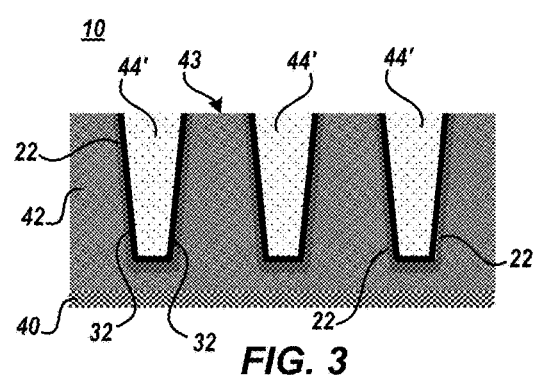

FIG. 3 depicts cross section views of semiconductor structure 10 at an intermediate stage of semiconductor device fabrication, in accordance with various embodiments of the present invention. At the present stage of fabrication, structure 10 is planarized.

One of the techniques available for planarization is a chemical-mechanical polishing (hereinafter "CMP") process in which a chemical slurry is used along with a polishing pad. The mechanical movement of the pad relative to the structure 10 and the abrasive slurry provide the abrasive force for removing the exposed material off the structure 10 surface. Planarization is a method of treating a surface to remove discontinuities, such as by polishing (or etching), thereby "planarizing" the surface. Excess flowable layer 44 material is generally removed while retained flowable layer 44 material is retained within trenches 4, thereby forming contact dielectric portions 44'. Subsequent to planarization, structure 10 may include a planar surface 43 including the top surface of dielectric layer 42, the top surface of portion 32, the top surface of contact dielectric portion 44'. Surface 43 may also include the top surface of portion 22 in embodiments where barrier layer 20 is utilized.

Figure 4:
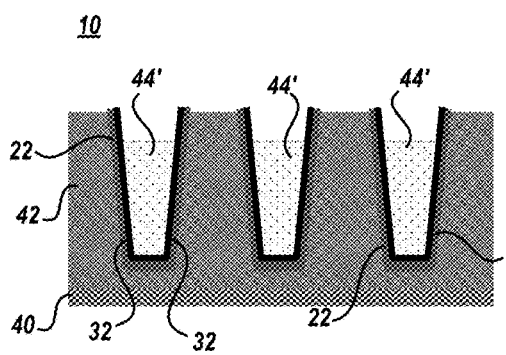
Figure 5:
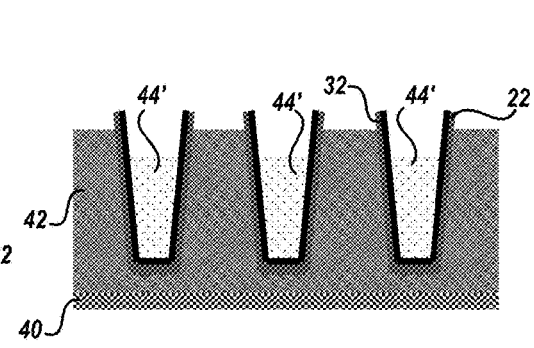

FIG. 4 and FIG. 5 depict cross section views of semiconductor structure 10 at an intermediate stage(s) of semiconductor device fabrication, in accordance with various embodiments of the present invention. At the present stage(s) of fabrication, dielectric layer 42 and contact dielectric portions 44' are recessed.

Dielectric layer 42 and contact dielectric portions 44' may be recessed utilizing subtractive etching techniques. An applied mask (not shown) protect the underlying regions from an etchant utilized to remove non masked regions of dielectric layer 42 and/or contact dielectric portions 44'. The recessing of dielectric layer 42 and contact dielectric portions 44' can be formed using process steps such as, without limitation: material deposition or formation; photolithography; imaging; etching; and cleaning. For instance, a soft mask or a hard mask can be formed to serve as the mask while non-masked material 42 and portions 44' is removed by the etchant. A particular etchant may be utilized to recess dielectric layer 42 and a different etchant may be utilized to recess portions 44'. Alternatively, a single etchant may be utilized to recess material 42 and portions 44'. The exposure to the etchant(s) may be timed to remove only upper sections of material 42 and portions 44' thereby exposing portions 32 and/or 22 above the upper surface of the retained section of dielectric layer 42. Subsequent to the recessing of dielectric layer 42 and portions 44', the top surface of portions 44' within trenches 41 may be lower than the upper surface of dielectric layer 42.

Figure 6:
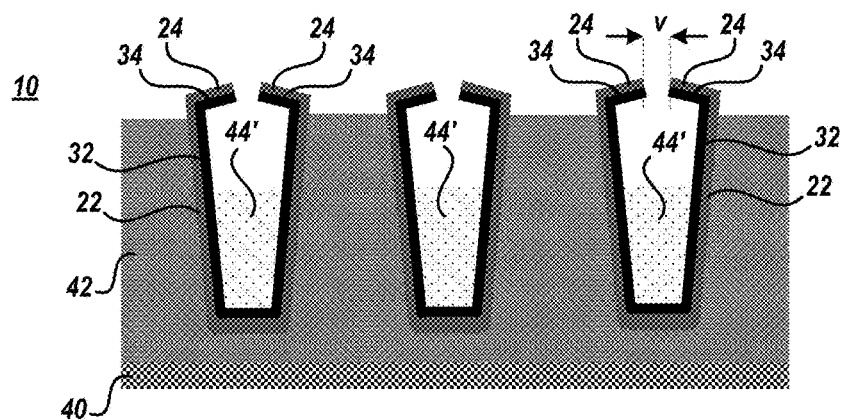

FIG. 6 depicts a cross section view of semiconductor structure 10 at an intermediate stage(s) of semiconductor device fabrication, in accordance with various embodiments of the present invention. At the present stage of fabrication, portions 34 and/or portions 24 are formed.

Portions 34 may be formed by subjecting structure 10 to a CMP process, wherein the portions 22 and/or 32 above the upper surface of dielectric layer 42 are bend inward toward its respective pair, thus forming portions 24 and portions 34 respectively. For example, the force of the polishing bends the exposed portion 32 of emitter 2 and portion 32 of collector 4 inward to form portions 34. Likewise, in those embodiments utilizing barrier layer 20, the polishing pad also bends portion 22 of emitter 2 and portion 22 of collector 4 inward to form portions 24. An opening between portion pairs 24 and portion pairs 34 has a width "v," of approximately 1-30 nm. As such, in the subsequent stage of fabrication, portions 22,32 are exposed above the upper surface of dielectric layer 42 only as much as would result in the formation of the opening of width "v" during the present fabrication stage of bending of portions 22,32 to form portions 24,34. In embodiments, the materials of conductive layer 30 and/or barrier layer 20 are chosen for their propensity for the exposed portions 22,32 above dielectric layer 42 to fold inward to thus form portions 24,34.

Figure 7:
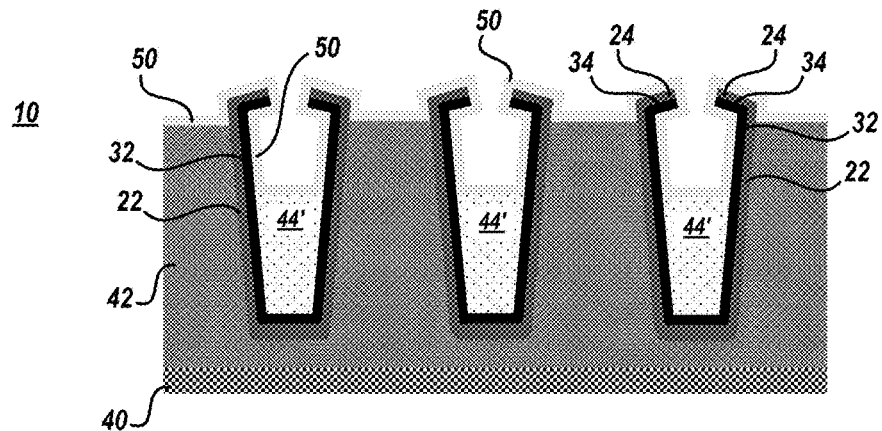

FIG. 7 depicts a cross section view of semiconductor structure 10 at an intermediate stage(s) of semiconductor device fabrication, in accordance with various embodiments of the present invention. At the present stage of fabrication, dielectric layer 50 is formed. The dielectric layer 50 may protect portions 24,34 and portions 22,32 during subsequent fabrication stage so as to not short portions 32,34 during gate 12 formation. Dielectric layer 50 may be an dielectric, such as an oxide or nitride and may be formed as a blanket layer upon the upper surface of dielectric layer 42, exposed portions 24, 34, and upon contact dielectric portions 44' to a thickness ranging from about 0.5 nm to about 10 nm. Dielectric layer 50 may be deposited using an iRad (In-situ radical assisted deposition) tool commercially available from Tokyo Electron Limited (TEL), chemical vapor deposition (CVD), or atomic layer deposition (ALD), etc.

Figure 8:
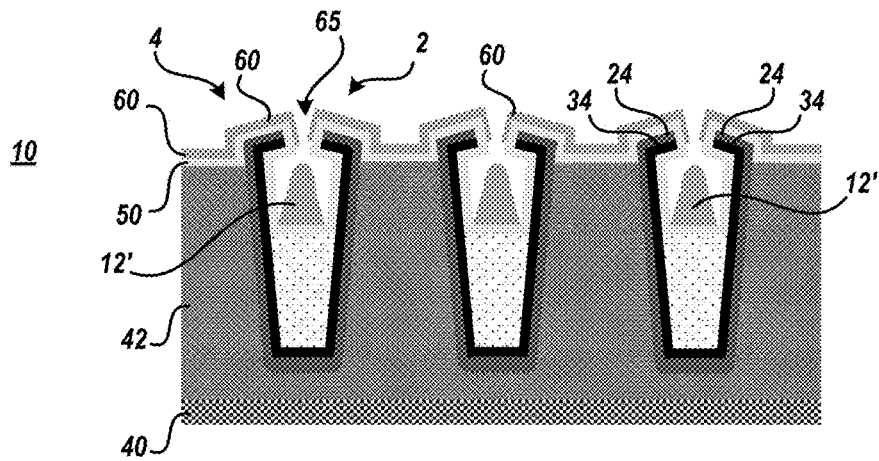

FIG. 8 depicts a cross section view of semiconductor structure 10 at an intermediate stage(s) of semiconductor device fabrication, in accordance with various embodiments of the present invention. At the present stage of fabrication, gate 12' is formed. Gate 12' may be formed by Ionized physical vapor deposition (IPVD), also referred to as ionized metal plasma (IMP), processes that sputter conductive material 60 generally upon the dielectric layer 50. Conductive material 60 may be e.g. copper, nickel, aluminum, tantalum, molybdenum, tungsten, or cobalt. Conductive material 60 may be sputtered through opening 65 between the emitter 2 and the collector 4 upon the dielectric layer 50. The buildup of deposited material 60 through opening 65 upon the dielectric layer 50 forms gate 12'. In embodiments, a resputter technique may be utilized to maintain opening 65 so as to sufficiently form gate 12'. For example, the applied bias on the wafer can result in more etching than deposition if gate opening 65 began to close off.

Figure 9:
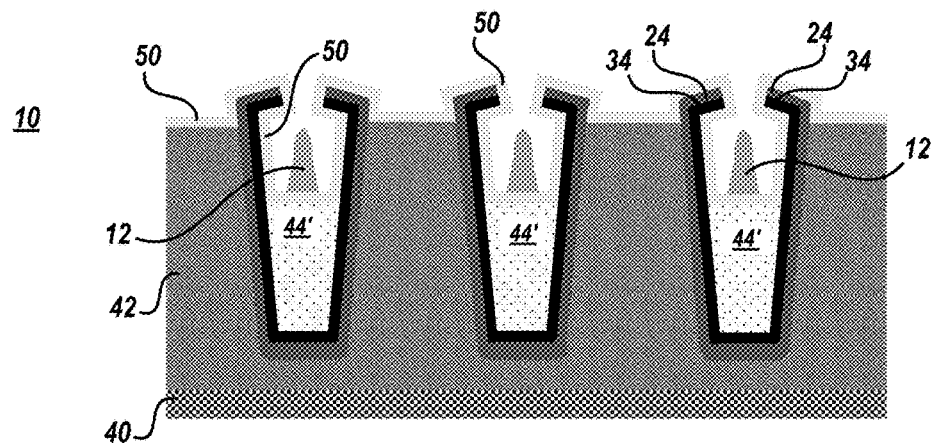

FIG. 9 depicts a cross section view of semiconductor structure 10 at an intermediate stage(s) of semiconductor device fabrication, in accordance with various embodiments of the present invention. At the present stage of fabrication, gate 12 is formed. Gate 12 may be formed subsequent to a conductive material 60 etch bath that removes conductive material 60 and portions of gate 12' upon structure 10. For example, exposure to a wet etch bath may be timed so as to sufficiently remove conductive material 60 and portions of gate 12'. Gate 12 generally is the material of gate 12' that remains subsequent to the etch bath. Gate 12 may alternatively formed by utilizing a CMP processes to remove conductive material 60 and portions of gate 12' and retaining gate 12.

Figure 10:
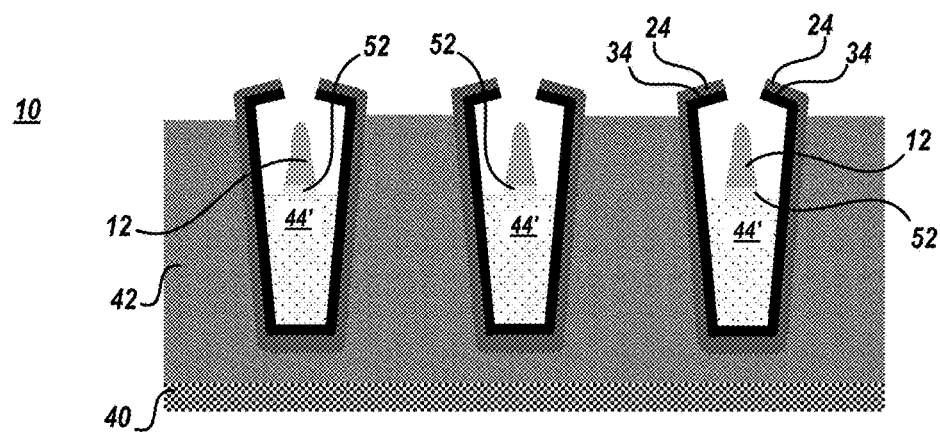

FIG. 10 depicts a cross section view of semiconductor structure 10 at an intermediate stage(s) of semiconductor device fabrication, in accordance with various embodiments of the present invention. At the present stage of fabrication, exposed dielectric layer 50 is removed. Exposed areas of dielectric layer 50 may be removed by a dielectric material 50 etch bath that removes exposed dielectric layer 50 from structure 10. An unexposed region of dielectric layer 50 between gate 12 and contact dielectric portions 44' may be retained to form gate dielectric 52. The etchant may be chosen to selectively remove the material of dielectric layer 50 while not removing the material of e.g., dielectric layer 42, contact dielectric portion 44', etc. In some embodiments, a similar etching stage or etchant may be utilized to remove e.g., conductive material 60 and exposed areas of dielectric layer 50.

Figure 11:
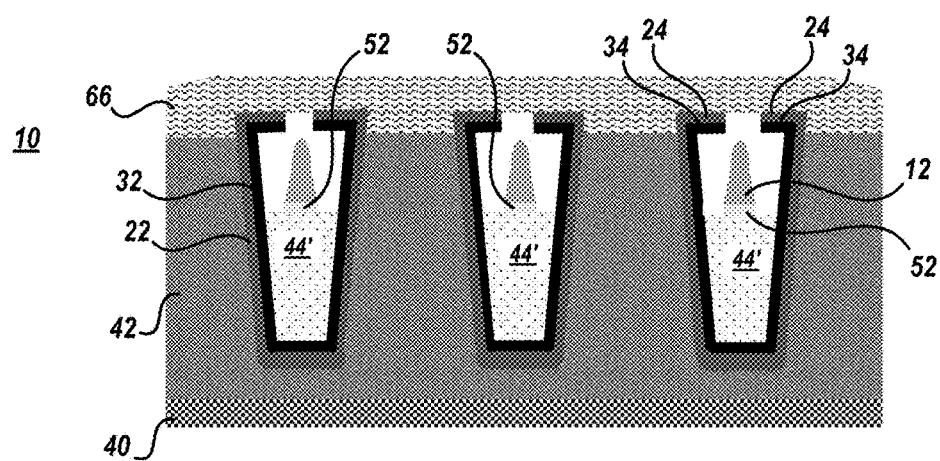

FIG. 11 depicts a cross section view of semiconductor structure 10 at an intermediate stage(s) of semiconductor device fabrication, in accordance with various embodiments of the present invention. At the present stage of fabrication, a non-conformal encapsulation layer 66 is formed. Encapsulation layer 66 may be a dielectric, such as an oxide or nitride and may be formed as a blanket layer upon the upper surface of dielectric layer 42 and upon the field emission device (e.g., upon the emitter 2 and collector 4) to a thickness ranging from about 0.01 um to about 0.05 um. Encapsulation layer 66 may be deposited using an iRad tool, CVD, PVD, spin-on, etc. The non-conformal encapsulation layer 66 may have a non-planar surface that does not reflect the topography of the underlying structure. The thickness of the non-conformal may be greater above devices and thinner above locations absent of devices. The deposition of the encapsulation layer 66 may further bend portions 24, 34 inward (e.g., decrease angle 26, and/or angle 36, respectively). The encapsulation layer 66 may not protrude into gap 17 between the emitter 2 and collector 4.

Figure 12:
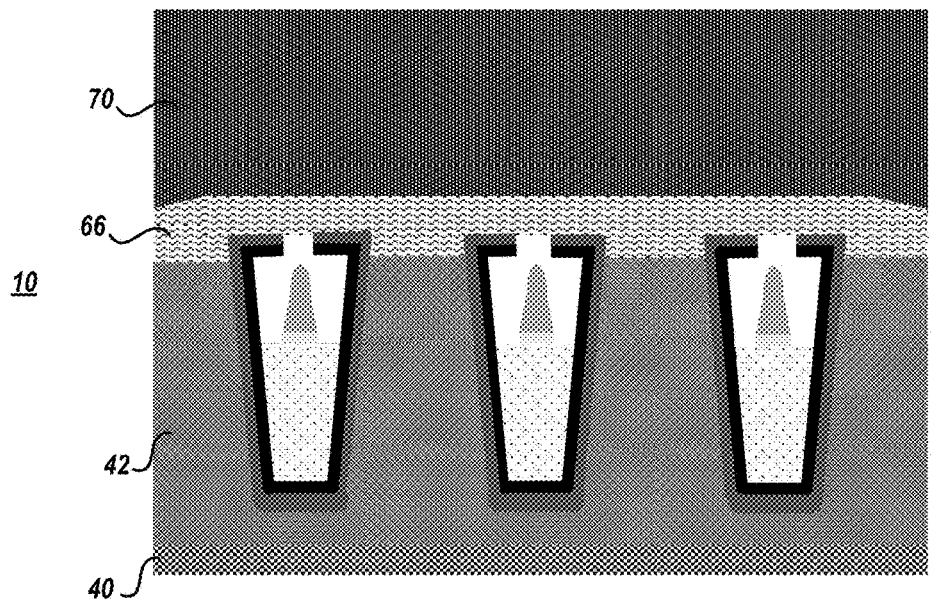

FIG. 12 depicts a cross section view of semiconductor structure 10 at an intermediate stage(s) of semiconductor device fabrication, in accordance with various embodiments of the present invention. At the present stage of fabrication, a carrier 70 is adhered to structure 10. Carrier 70 may be glass, Si, glass ceramics, or the like. Structure 10 may be adhered to carrier 70 by adhesive, bonding material, etc.

Figure 13:
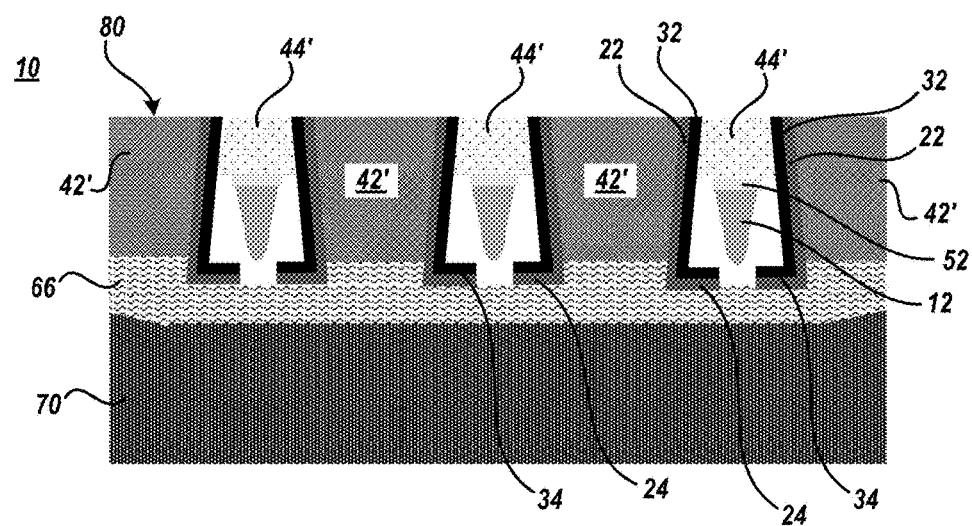

FIG. 13 depicts cross section views of semiconductor structure 10 at an intermediate stage of semiconductor device fabrication, in accordance with various embodiments of the present invention. At the present stage of fabrication, structure 10 is planarized from the backside.

One of the techniques available for planarization is a chemical-mechanical polishing (hereinafter "CMP") process. The mechanical movement of the pad relative to the backside of structure 10 and the abrasive slurry provide the abrasive force for removing carrier 40, backside portion of dielectric material 42, backside portion of liner layer 20, backside portion of conductive layer 30, and or backside portions of contact dielectric 44'. Planarization is a method of treating a backside surface 80 to remove discontinuities, such as by polishing (or etching), thereby "planarizing" the surface 80.

The planarization process may stop after polishing proceeds through the backside portion of liner layer 20 and backside portion of conductive layer 30 to divide them into separate predominantly vertical segments. The planarization effectively creates a dielectric portion 42' that is a retained section of dielectric layer 42 and that separates neighboring field emission transistor or other structure 10 devices. Subsequent to planarization, backside surface 80 includes coplanar backside surfaces of retained dielectric portions 42', portion 32, and contact dielectric portion 44', respectively. Surface 80 may also include the backside surface of portion 22 in embodiments where barrier layer 20 is utilized.

Figure 14:
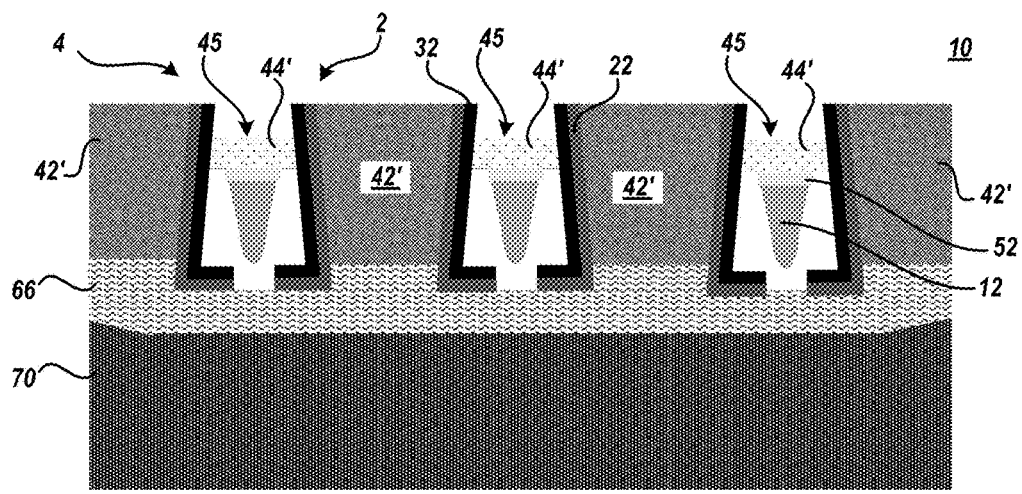

FIG. 14 depicts cross section views of semiconductor structure 10 at an intermediate stage of semiconductor device fabrication, in accordance with various embodiments of the present invention. At the present stage of fabrication, contact dielectric 44' is recessed from the backside in gate 12 regions of structure 10 in order to form a selective gate contact.

Contact dielectric portions 44' may be recessed from the backside in gate 12 regions utilizing subtractive etching techniques. An applied mask (not shown) protect the underlying regions from an etchant utilized to remove non masked regions of contact dielectric portions 44'. The recessing of dielectric portions 44' can be formed using process steps such as, without limitation: material deposition or formation; photolithography; imaging; etching; and cleaning. For instance, a soft mask or a hard mask can be formed to serve as the mask while non-masked portions 44' are removed by the etchant. The exposure to the etchant may be timed to remove only some of portions 44' while retaining portions 44' between the emitter 2 and collector 4. Subsequent to the recessing portions 44' from the backside, a backside surface 45 of portions 44' is recessed from surface 80.

Figure 15:
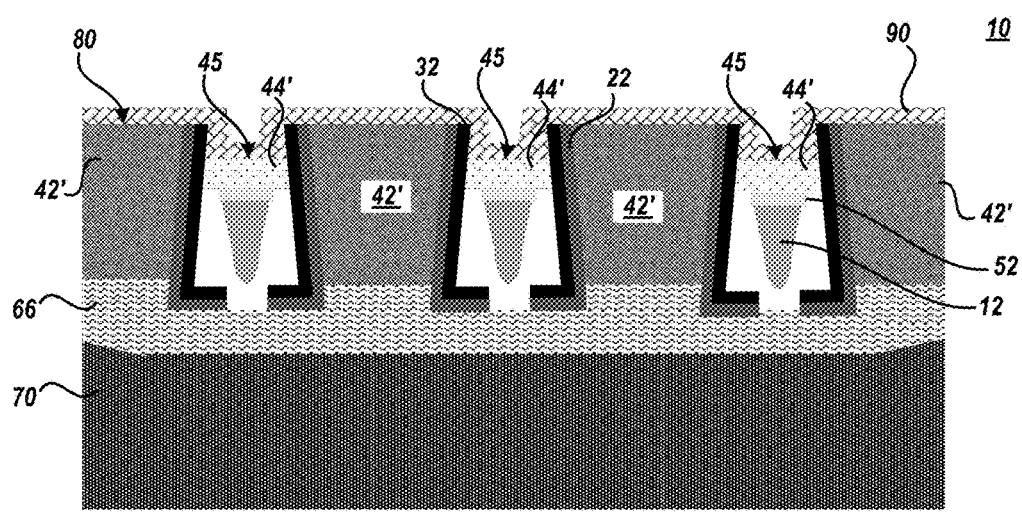

FIG. 15 depicts cross section views of semiconductor structure 10 at an intermediate stage of semiconductor device fabrication, in accordance with various embodiments of the present invention. At the present stage of fabrication, gate spacer 90 is formed. Conformal spacer 90 may generally electrically isolate neighboring gate contacts. Spacer 90 may be a dielectric, such as an oxide or nitride, and may be formed as a blanket layer upon the backside surface of dielectric portions 42', the backside surface of portion 22, the backside surface and sidewall segments of portion 32, and/or upon the backside recessed surface 45 of contact dielectric portion 44' to a thickness ranging from about 0.5 nm to about 10 nm. Spacer 90 may be deposited by iRAD tool, CVD, PVD, ALD, etc.

Figure 16:
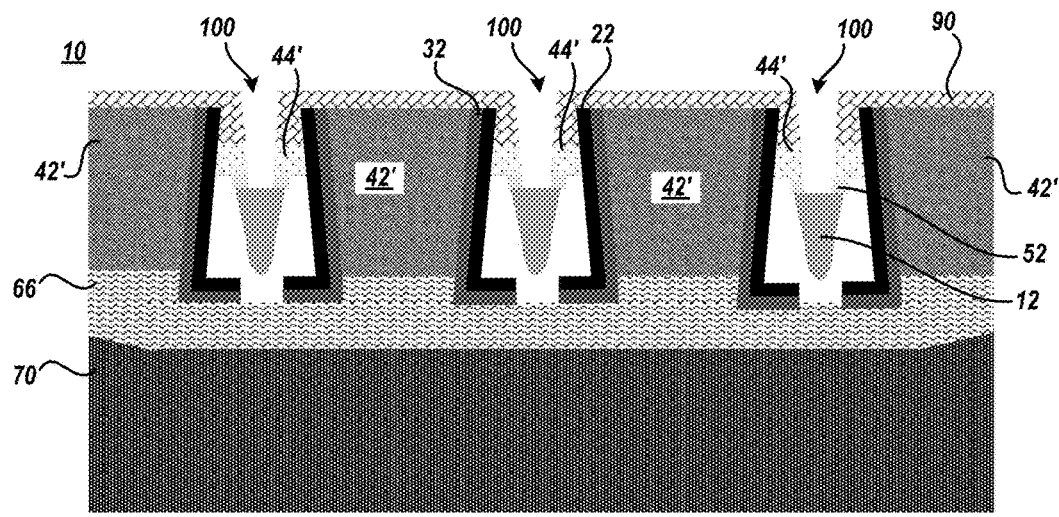

FIG. 16 depicts cross section views of semiconductor structure 10 at an intermediate stage of semiconductor device fabrication, in accordance with various embodiments of the present invention. At the present stage of fabrication, contact trenches 100 are formed in gate 12 regions of structure 10.

Contact trenches 100 may be formed from the backside of structure 10 in gate 12 regions utilizing subtractive etching techniques. An applied mask (not shown) protect the underlying regions from an etchant utilized to remove non masked regions of gate spacer 90, contact dielectric portions 44', and gate dielectric 52 to expose a backside surface of gate 12. The formation of trenches 100 can be formed using process steps such as, without limitation: material deposition or formation; photolithography; imaging; etching; and cleaning. For instance, a soft mask or a hard mask can be formed to serve as the mask while non-masked portions are removed by the etchant. Known etch processes may be utilized to generally form trenches 100 that have sidewalls that may be perpendicular to the backside surface of structure 10, tapered out, or tapered in, e.g., as is shown Alternatively, contact trenches may be formed via drilling or other chemical/mechanical material removal technique to remove regions of gate spacer 90, contact dielectric portions 44', and gate dielectric 52 to expose a backside surface of gate 12. Exemplary removal techniques include reactive ion etching (RIE) or selective wet etching. Subsequent to formation of trench 100 from the backside, the trench 100 may include sidewalls including a sidewall segment of gate dielectric 52, a sidewall segment of contact dielectric 44', and a sidewall segment of spacer 90.

Figure 17:
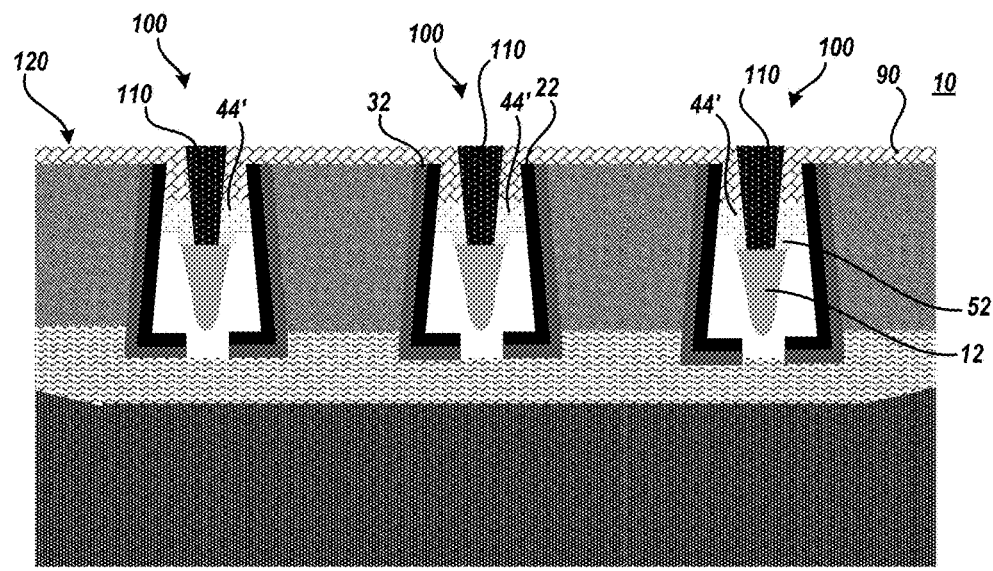

FIG. 17 depicts cross section views of semiconductor structure 10 at an intermediate stage of semiconductor device fabrication, in accordance with various embodiments of the present invention. At the present stage of fabrication, contacts 110 are formed in gate 12 regions of structure 10. Contact 110 may be an electrically conductive and may be fabricated a plating process including forming a seed layer, performing an electrochemical plating (ECP) to fill the trench 100 with a conductive material, and then performing a CMP to remove excess conductive material. Additional formation techniques include CVD fill of the opening (tungsten or cobalt), or PVD deposition followed by reflow (copper). Contact 110 may be metallic e.g., Cobalt, Copper, tungsten, etc. Subsequent to the formation of contacts 110 a planar backside surface 120 in gate 12 regions of structure 10 may include the backside surface of spacer 90 and the backside surfaces of contacts 110.

Figure 19:
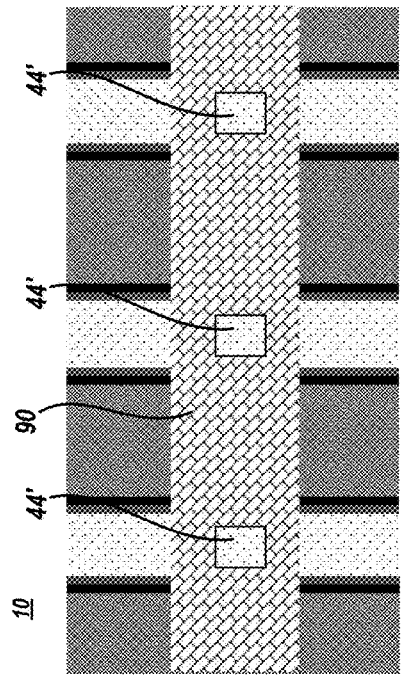
FIG. 18-FIG. 21 depict backside views of a semiconductor structure at intermediate stages of semiconductor device fabrication, in accordance with various embodiments of the present invention.
Figure 21:
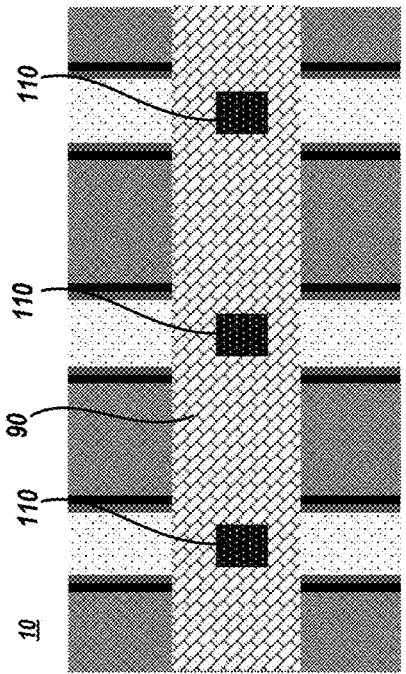
Figure 18:
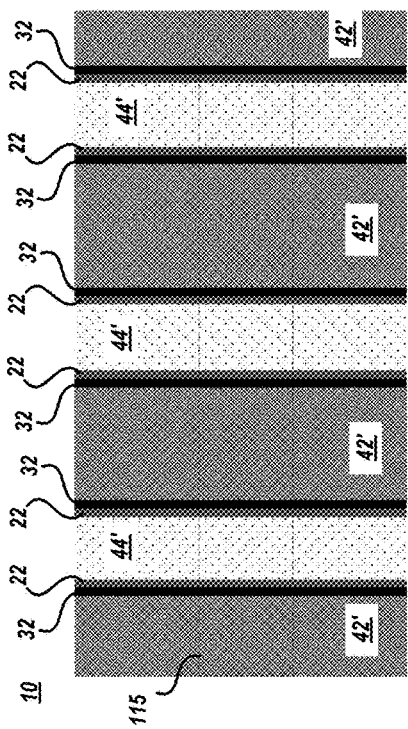
Figure 20:
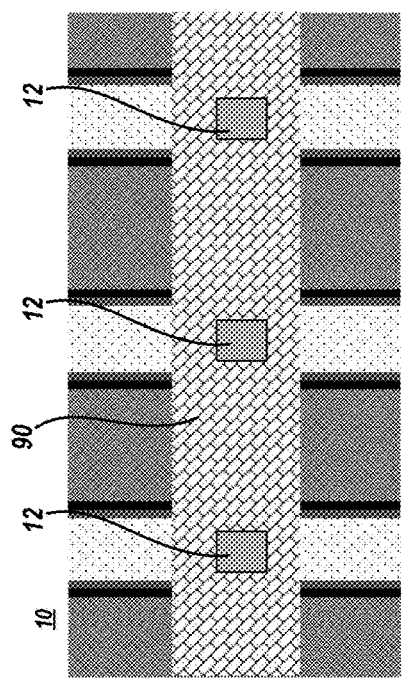

FIG. 18-FIG. 21 depict backside views of semiconductor structure 10 at intermediate stages of semiconductor device fabrication corresponding to FIG. 14-FIG. 17, respectively. As shown in FIG. 18, contact dielectric 44' is recessed from the backside in gate 12 regions 115 of structure 10. For clarity, though gate 12 regions 115 are shown generally aligned, gate 12 regions 115 may be staggered with respect to neighboring gate(s) 12. As shown in FIG. 19 gate spacer 90 is formed, in gate 12 regions 115 of structure 10. As shown in FIG. 20, contact trenches 100 are formed in gate 12 regions 115 of structure 10. As shown in FIG. 21, contacts 110 are formed within the contact trenches 100 within gate 12 regions 115 of structure 10.

Figure 22:
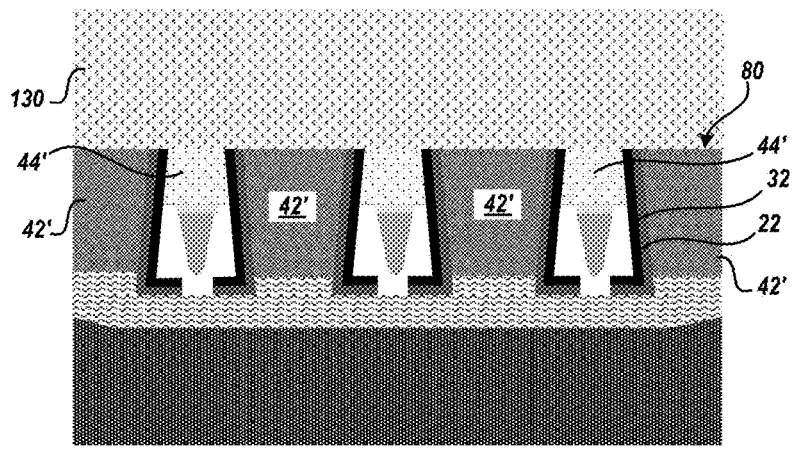
FIG. 22-FIG. 26 depicts cross section views of a semiconductor structure at intermediate stages of semiconductor device fabrication, in accordance with various embodiments of the present invention.

FIG. 22 depicts cross section views of semiconductor structure 10 at an intermediate stage of semiconductor device fabrication, in accordance with various embodiments of the present invention. At the present stage of fabrication, emitter/collector (EC) dielectric 130 is formed upon the backside in emitter contact and collector contact regions of structure 10. EC dielectric 130 may be e.g., an oxide or nitride and may be formed as a blanket layer upon the backside surface 80 within emitter contact and collector contact regions of structure 10 to a thickness ranging from about 0.01 um to about 0.5 um. EC dielectric 130 may be deposited by CVD, ALD, PVD, iRAD, spin-on, etc. EC dielectric 130 may be deposited to a similar thickness as gate spacer 90. In these embodiments, the EC dielectric 130 may be formed within emitter contact and collector contact regions of structure 10 abutting and adjacent to the spacer 90 formed within the gate 12 regions 115 of structure 10. Alternatively, EC dielectric 130 may be deposited to a greater thickness than and upon gate spacer 90. In these embodiments, the EC dielectric 130 may be formed within emitter contact and collector contact regions of structure 10 and upon the spacer 90 of structure 10.

Figure 23:
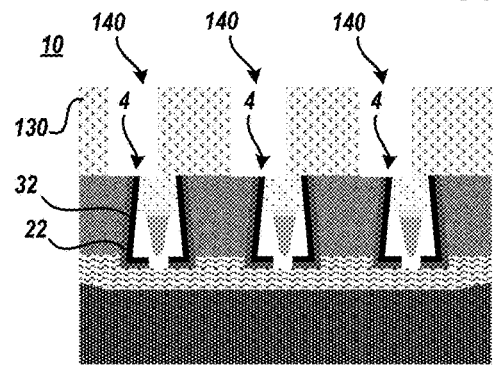
Figure 25:
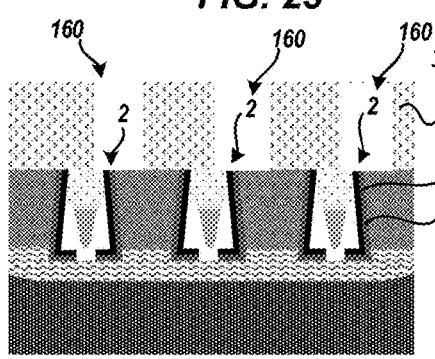

FIG. 23 and FIG. 25 depict cross section views of semiconductor structure 10 at an intermediate stage of semiconductor device fabrication, in accordance with various embodiments of the present invention. At the present stage of fabrication, collector trenches 140 and emitter trenches 160 are formed in regions within emitter contact and collector contact regions of structure 10.

Collector trenches 140 are formed from the backside of structure 10 in collector regions and emitter trenches 160 are formed from the backside of structure in emitter regions of structure 10. Collector trenches 140 and emitter trenches 160 may be formed by subtractive etching techniques where an applied mask (not shown) protects the underlying regions from an etchant utilized to remove non masked regions of EC dielectric 130 to expose a backside surface of emitter 2 and collector 4, respectively. The formation of trenches 140, 160 can be formed using process steps such as, without limitation: material deposition or formation; photolithography; imaging; etching; and cleaning. For instance, a soft mask or a hard mask can be formed to serve as the mask while non-masked portions are removed by the etchant. Known etch processes may be utilized to generally form trenches 140, 160 that have sidewalls that may be perpendicular to the backside surface of structure 10, e.g., as is show, tapered out, or tapered in. Alternatively, trenches 140, 160 may be formed via drilling or other chemical/mechanical material removal technique to remove regions of ED dielectric to expose a backside surface of emitter 2 and collector 4, respectively. Example techniques to expose the backside of emitter 2 and collector 4 include RIE and wet etching. In embodiments where EC dielectric is formed upon the spacer 90 of structure 10 within gate 12 regions 115 of structure 10, further gate trenches may be similarly formed to expose gate contact 110.

Figure 24:
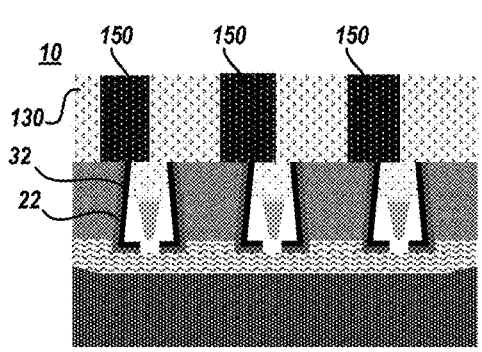
Figure 26:
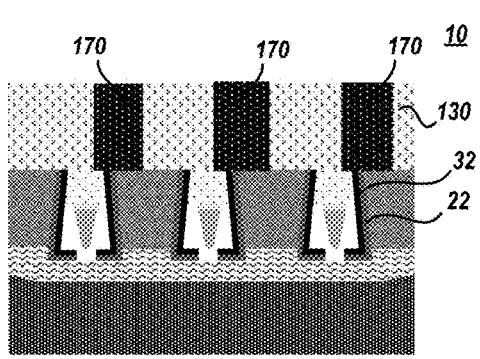

FIG. 24 and FIG. 26 depict cross section views of semiconductor structure 10 at an intermediate stage of semiconductor device fabrication, in accordance with various embodiments of the present invention. At the present stage of fabrication, collector contacts 150 and emitter contacts 170 are formed in collector and emitter regions of structure 10. Contacts 150, 170 may be an electrically conductive and may be fabricated a plating process including forming a seed layer, performing an electrochemical plating (ECP) to fill the trenches, 140, 160, respectively, with a conductive material, and then performing a CMP to remove excess conductive material. Alternately, conductive contacts may be created using a PVD reflow process, ALD, or CVD fill of trenches 140 and 160. Contacts 150, 170 may be metallic e.g., Cobalt, Copper, Nickel, Tantalum, Tungsten, Aluminum, etc. In embodiments where EC dielectric is formed upon the spacer 90 of structure 10 within gate 12 regions 115 of structure 10, further gate 12 contacts may be formed within the gate trenches formed within EC dielectric 130 to expose gate contacts 110.

Figure 27:
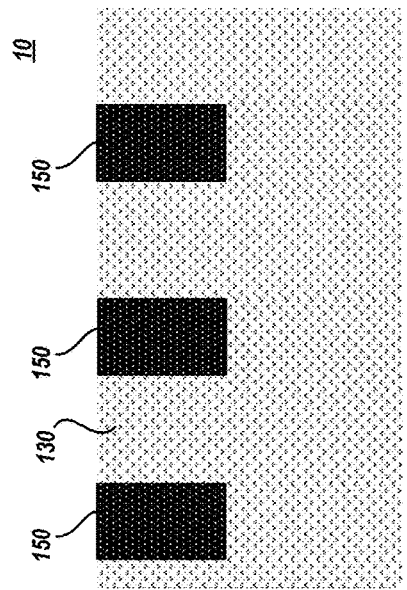
FIG. 27-FIG. 30 depict backside views of a semiconductor structure at intermediate stages of semiconductor device fabrication, in accordance with various embodiments of the present invention
Figure 28:
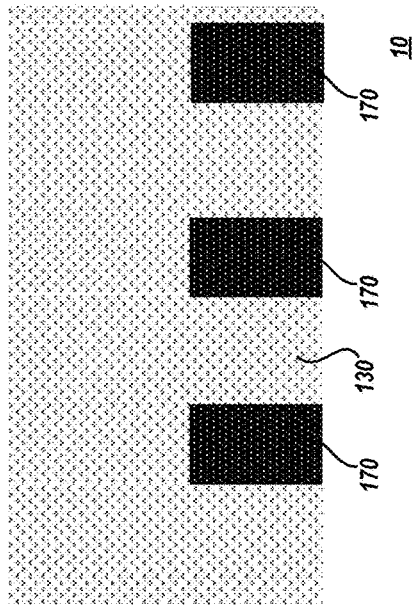
Figure 29:
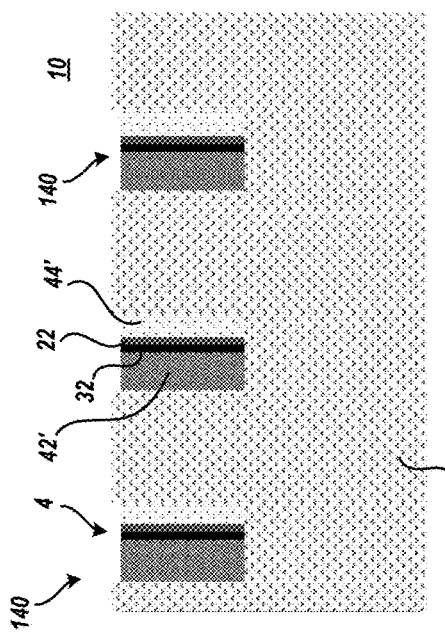
Figure 30:
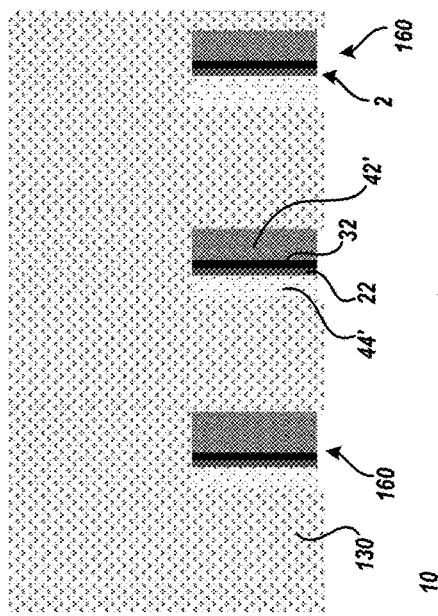

FIG. 27-FIG. 30 depict backside views of semiconductor structure 10 at intermediate stages of semiconductor device fabrication corresponding to FIG. 23-FIG. 26, respectively. As shown in FIG. 27, collector trench 140 is formed from the backside collector 4 regions of structure 10. The collector trench 140 may expose, a backside surface of dielectric portions 42', backside surface of portion 32 of collector 4, backside surface of portion 22 of collector 4, and backside surface of contact dielectric portion 44'. As shown in FIG. 28, collector contacts 150 are formed within the collector trenches 140 within collector 4 regions of structure 10. As shown in FIG. 29, emitter trench 160 is formed from the backside emitter 2 regions of structure 10. The emitter trench 160 may expose, a backside surface of dielectric portions 42', backside surface of portion 32 of emitter 2, backside surface of portion 22 of emitter 2, and backside surface of contact dielectric portion 44'. As shown in FIG. 30, emitter contacts 170 are formed within the emitter trenches 140 within emitter 2 regions of structure 10.

Though shown as a last stage of fabrication, structure 10 may undergo further fabrication steps that may add or remove materials, etc. in further back end of line fabrication steps to form a semiconductor device, such as an integrated circuit chip, processor, etc.

Figure 31:
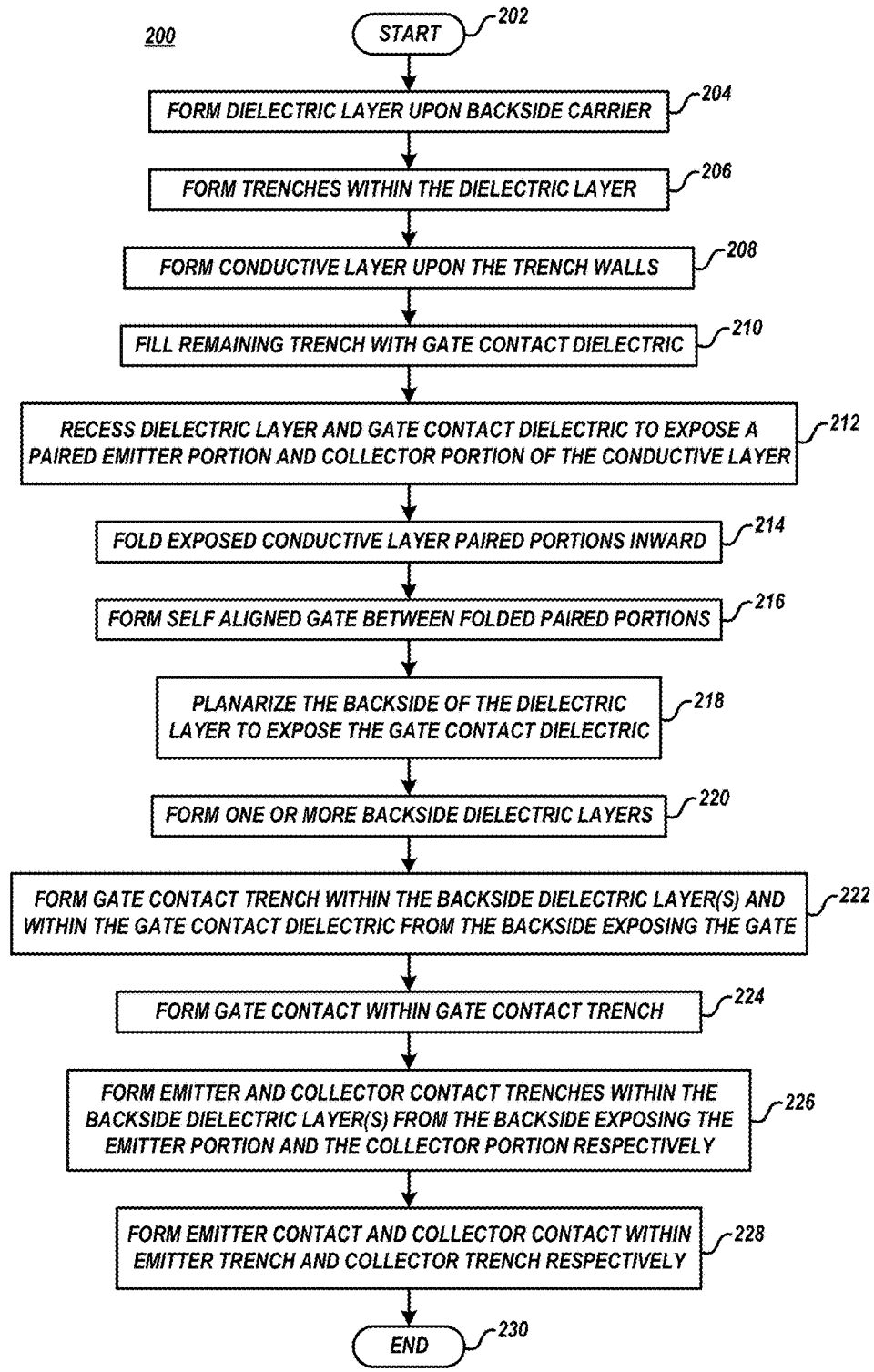
FIG. 31 depicts a semiconductor device fabrication method, in accordance with various embodiments of the present invention.

FIG. 31 depicts an exemplary process flow method 200 for fabricating a semiconductor device, in accordance with various embodiments of the present invention. Method 200 begins at block 202 and continues by forming a dielectric layer upon a backside carrier (block 204). For example, dielectric layer 42 may be deposited upon carrier 40. Method 200 may continue with forming a field emission transistor trench within the dielectric layer. For example, trench 41 may be formed with dielectric layer 42. Method 200 may continue with forming a conductive layer upon the field emission trench walls. For example, a conductive layer 20 may be formed upon dielectric layer 42 and upon walls of trench 41. Further, the conductive layer 20 may be formed selectively upon the walls of the trench 41. Method 200 may continue with filling the remaining trench with a contact dielectric (block 210). For example, a contact dielectric layer 44 is formed upon the conductive layer 20 filling the remaining trench 41. Alternatively, the contact dielectric layer 44 may be formed and subsequently recessed forming a planar surface 43 including the upper surface of dielectric layer 42, an upper surface of conductive layer 20, and an upper surface of contact dielectric 44'.

Method 200 may continue with recessing the dielectric layer and the gate contact dielectric to expose a paired emitter portion and collector portion of the conductive layer (block 212). For example, dielectric layer 42 and gate dielectric 44' within trench 41 are recessed exposing an emitter 2 portion 22 of conductive layer 20 and a collector 4 portion 22 of conductive layer 20.

Method 200 may continue with folding the exposed conductive layer paired portions inward (block 214). For example, a CMP planarization process may force the exposed emitter 2 portion 22 and the exposed collector 4 portion 22 inward toward the respective other portion 22. A gap or opening of width "v" exists between the folded emitter 2 portion 22 and the folded collector 4 portion 22.

Method 200 may continue with forming a self-aligned gate between the paired folded conductive layer portions (block 216). For example, a metallic may be sputtered between the paired portions through the opening of width "v". The buildup of metallic or otherwise conductive material may form gate 12. The gate 12 may be formed upon the gate contact dielectric 44' or upon another gate contact layer (e.g., layer 50) formed upon the gate contact dielectric 44'.

Method 200 may continue with planarizing backside of the dielectric layer to expose the gate contact dielectric (block 218). For example, carrier 40 may be removed and the dielectric layer 42 may be polished to remove backside material until the gate contact dielectric 44' is exposed. Method 200 may continue with forming one or more backside dielectric layers (block 220). For example, spacer 90 may be formed upon the backside surface of dielectric portions 42' and upon the backside of gate contact dielectric 44' in gate 12 regions 115 of structure 10. Further dielectric layer 130 may be formed upon dielectric 42 layer and upon gate contact dielectric 44' in emitter 2 and collector 4 regions of structure 10.

Method 200 may continue with forming a gate contact trench within the backside dielectric layer(s) and within the gate contact dielectric from the backside to expose the gate (block 222). For example, gate trench 100 may be drilled or etched to remove material of e.g. spacer 90, material of contact dielectric portion 44', material of gate dielectric 52, etc. to expose the backside of gate 12. Method 200 may continue with forming a gate contact within the gate contact trench (block 224). For example, a metallic material may be deposited within the gate trench 100 to form gate contact 110.

Method 200 may continue with forming an emitter contact trench and a collector trench within the backside dielectric layer(s) to expose respective emitter portion of conductive layer and the collector portion of the conductive layer (block 226). For example, trench 140, 160 may be drilled or etched to remove material of e.g., dielectric 130 to expose the emitter 2 portion 22 and to expose the collector 4 portion 22, respectively. Method 200 may continue with forming an emitter contact and a collector contact within the emitter trench and collector trench respectively (block 228). For example, a metallic material may be deposited within the collector trench 140 to form collector contact 150 and deposited within the emitter trench 160 to form collector contact 170. Method 200 may end at block 230.

Figure 32:
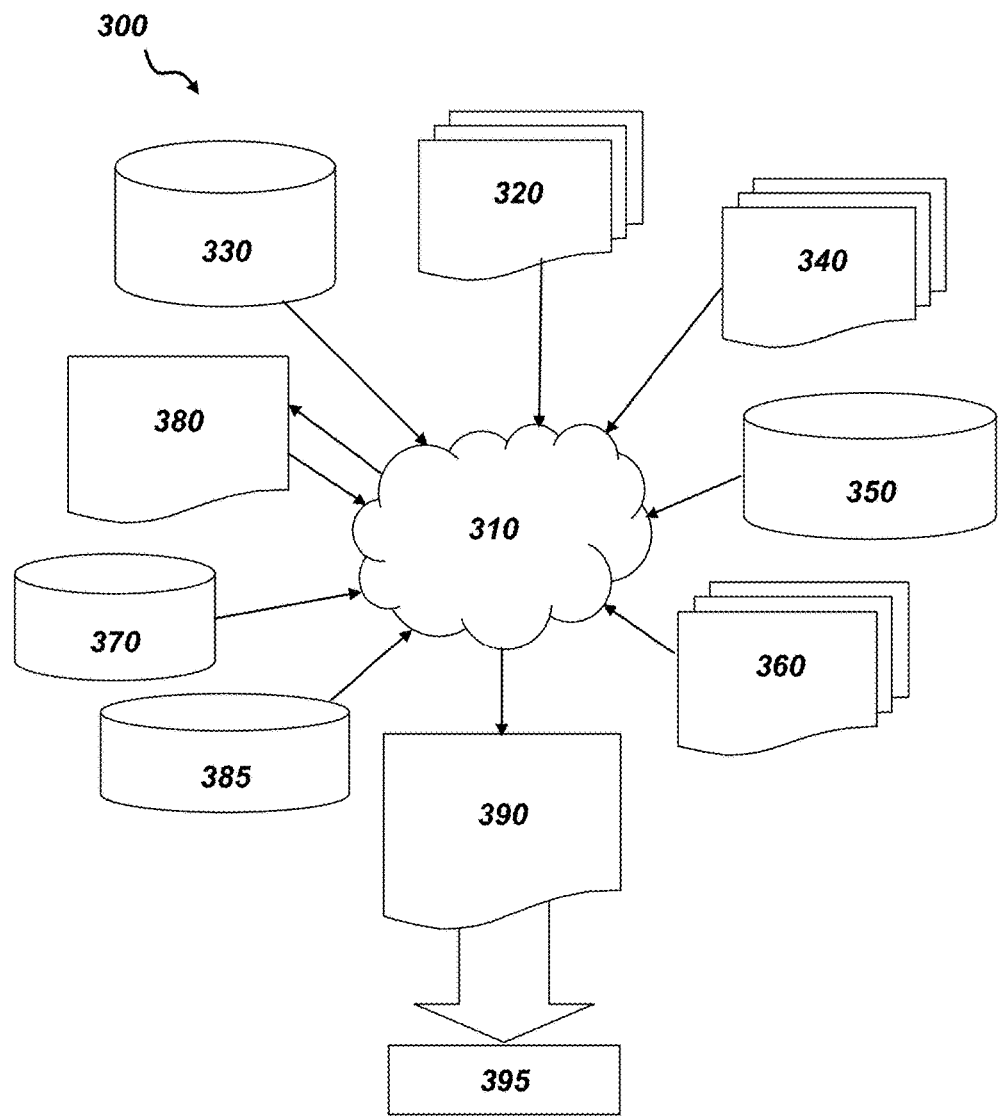
FIG. 32 depicts a flow diagram of a design structure used in semiconductor design, manufacture, and/or test, in accordance with various embodiments of the present invention.

Referring now to FIG. 32, a block diagram of an exemplary design flow 300 used for example, in semiconductor integrated circuit (IC) logic design, simulation, test, layout, and/or manufacture is shown. Design flow 300 includes processes, machines and/or mechanisms for processing design structures or devices to generate logically or otherwise functionally equivalent representations of the structures and/or devices described above and shown in FIG. 1-FIG. 30.

The design structures processed and/or generated by design flow 300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 300 may vary depending on the type of representation being designed. For example, a design flow 300 for building an application specific IC (ASIC) may differ from a design flow 300 for designing a standard component or from a design flow 300 for instantiating the design into a programmable array, for example a programmable gate array (PGA) or a field programmable gate array (FPGA) offered by Altera® Inc. or Xilinx® Inc.

FIG. 32 illustrates multiple such design structures including an input design structure 320 that is preferably processed by a design process 310. Design structure 320 may be a logical simulation design structure generated and processed by design process 310 to produce a logically equivalent functional representation of a hardware device. Design structure 320 may also or alternatively comprise data and/or program instructions that when processed by design process 310, generate a functional representation of the physical structure of a hardware device. Whether representing functional and/or structural design features, design structure 320 may be generated using electronic computer-aided design (ECAD) such as implemented by a core developer/designer.

When encoded on a machine-readable data transmission, gate array, or storage medium, design structure 320 may be accessed and processed by one or more hardware and/or software modules within design process 310 to simulate or otherwise functionally represent an electronic component, circuit, electronic or logic module, apparatus, device, structure, or system such as those shown in FIG. 1-FIG. 30. As such, design structure 320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 310 preferably employs and incorporates hardware and/or software modules for synthesizing, translating, or otherwise processing a design/simulation functional equivalent of the components, circuits, devices, or structures shown FIG. 1-FIG. 30 to generate a Netlist 380 which may contain design structures such as design structure 320. Netlist 380 may comprise, for example, compiled or otherwise processed data structures representing a list of wires, discrete components, logic gates, control circuits, I/O devices, models, etc. that describes the connections to other elements and circuits in an integrated circuit design. Netlist 380 may be synthesized using an iterative process in which netlist 380 is resynthesized one or more times depending on design specifications and parameters for the device. As with other design structure types described herein, netlist 380 may be recorded on a machine-readable data storage medium or programmed into a programmable gate array. The storage medium may be a non-volatile storage medium such as a magnetic or optical disk drive, a programmable gate array, a compact flash, or other flash memory. Additionally, or in the alternative, the storage medium may be a system or cache memory, buffer space, or electrically or optically conductive devices in which data packets may be intermediately stored.

Design process 310 may include hardware and software modules for processing a variety of input data structure types including Netlist 380. Such data structure types may reside, for example, within library elements 330 and include a set of commonly used elements, circuits, and devices, including models, layouts, and symbolic representations, for a given manufacturing technology (e.g., different technology nodes, 14, 32 nm, 45 nm, 90 nm, etc.). The data structure types may further include design specifications 340, characterization data 350, verification data 360, design rules 370, and test data files 385 which may include input test patterns, output test results, and other testing information. Design process 310 may further include, for example, standard mechanical design processes such as stress analysis, thermal analysis, mechanical event simulation, process simulation for operations such as casting, molding, and die press forming, etc.

One of ordinary skill in the art of mechanical design can appreciate the extent of possible mechanical design tools and applications used in design process 310 without deviating from the scope and spirit of the invention claimed herein. Design process 310 may also include modules for performing standard circuit design processes such as timing analysis, verification, design rule checking, place and route operations, etc.

Design process 310 employs and incorporates logic and physical design tools such as HDL compilers and simulation model build tools to process design structure 320 together with some or all of the depicted supporting data structures along with any additional mechanical design or data (if applicable), to generate a second design structure 390. Design structure 390 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures).

Similar to design structure 320, design structure 390 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 1-FIG. 30. In one embodiment, design structure 390 may comprise a compiled, executable HDL simulation model that functionally simulates the devices shown in FIG. 1-FIG. 30.

Design structure 390 may also employ a data format used for the exchange of layout data of integrated circuits and/or symbolic data format (e.g. information stored in a GDSII (GDS2), GL1, OASIS, map files, or any other suitable format for storing such design data structures). Design structure 390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1-FIG. 30. Design structure 390 may then proceed to a stage 395 where, for example, design structure 390: proceeds to tape-out, is released to manufacturing, is released to a mask house, is sent to another design house, is sent back to the customer, etc.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

Unless described otherwise or in addition to that described herein, "depositing," "deposited," etc. may include any now known or later developed techniques appropriate for the material to be deposited, including, but not limited to: CVD, LPCVD, PECVD, semi-atmosphere CVD (SACVD), high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic level deposition (ALD), chemical oxidation, molecular beam epitaxy (MBE), plating or evaporation. Any references to "poly" or "poly silicon" should be understood to refer to polycrystalline silicon.

References herein to terms such as "vertical", "horizontal", etc. are made by way of example, and not by way of limitation, to establish a frame of reference. The term "horizontal" as used herein is defined as a plane parallel to the conventional plane or surface of the dielectric layer 42, regardless of the actual spatial orientation of the layer 42. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood that various other frames of reference may be employed for describing the present invention without departing from the spirit and scope of the present invention.

The invention claimed is:

1. A field emission transistor comprising:
   a trench formed within a dielectric layer;
   a gate formed within the trench which is in electrical communication with a gate contact;
   gate contact dielectric material surrounding the gate contact;
   an emitter lining a first sidewall of the trench and comprising a first emitter portion adjacent to the gate contact dielectric material and a second emitter portion angled from the first emitter portion toward the gate;
   a collector lining a second sidewall of the trench comprising, a first collector portion adjacent to the gate contact dielectric material and a second collector portion angled from the first collector portion toward the gate; and
   wherein the emitter and collector are separated from the gate by a void.

2. The field emission transistor of claim 1, wherein the first emitter portion and the first collector portion are substantially parallel to the gate.

3. The field emission transistor of claim 1, wherein the second emitter portion and the second collector portion are substantially perpendicular to the gate.

4. The field emission transistor of claim 1, wherein the second emitter portion is bent with respect to the first emitter portion and wherein the second collector portion is bent with respect to the first collector portion.

5. The field emission transistor of claim 1, wherein the second emitter portion faces the second collector portion.

6. The field emission transistor of claim 5, wherein second emitter portion is separated from the second collector portion by a gap that is less than the mean free path of elections in air.

7. The field emission transistor of claim 1, further comprising:
   an emitter contact in electrical communication with the first emitter portion, and;
   a collector contact in electrical communication with the first collector portion.

8. The field emission transistor of claim 1, wherein the second emitter portion is acutely angled from the first emitter portion toward the gate, and wherein the second collector portion is acutely angled from the first collector portion toward the gate.

9. The field emission transistor of claim 1, wherein the void separates the first emitter portion, the second emitter portion, the first collector portion, and the second collector portion from the gate.

\* \* \* \* \*